United States Patent
Bruins et al.

(10) Patent No.: US 11,964,781 B2
(45) Date of Patent: Apr. 23, 2024

(54) COUPLING UNIT FOR DETACHABLE COUPLING PARTS OF A SPACECRAFT

(71) Applicant: Aerospace Propulsion Products B.V., Klundert (NL)

(72) Inventors: Peter Christiaan Bruins, Klundert (NL); Antonius Marinus Christoffel Matthijsen, Klundert (NL)

(73) Assignee: Aerospace Propulsion Products B.V., Klundert (NL)

( * ) Notice: Subject to any disclaimer, the term of this patent is extended or adjusted under 35 U.S.C. 154(b) by 779 days.

(21) Appl. No.: 16/743,934

(22) Filed: Jan. 15, 2020

(65) Prior Publication Data
US 2021/0214107 A1    Jul. 15, 2021

(51) Int. Cl.
*B64G 1/64*    (2006.01)
(52) U.S. Cl.
CPC ...................... *B64G 1/64* (2013.01)
(58) Field of Classification Search
CPC ... B64G 1/64; B64G 1/44; B64G 1/62; B64G 1/222; B64G 1/645
See application file for complete search history.

(56) References Cited

U.S. PATENT DOCUMENTS

| | | | | |
|---|---|---|---|---|
| 3,204,515 A | * | 9/1965 | Dickie | F16B 31/005 411/434 |
| 3,333,788 A | * | 8/1967 | Dryden | B64G 1/12 102/378 |
| 4,929,135 A | * | 5/1990 | Delarue | F42B 15/36 102/378 |
| 5,123,794 A | * | 6/1992 | Pire | B64G 1/645 411/383 |
| 5,372,071 A | * | 12/1994 | Richards | F42B 15/38 102/378 |
| 5,400,713 A | * | 3/1995 | Humiston | F42B 15/36 102/378 |
| 5,671,650 A | * | 9/1997 | Aubret | B64G 1/641 102/378 |
| 7,837,154 B2 | * | 11/2010 | Trabandt | B64G 1/62 244/172.6 |
| 2004/0094673 A1 | | 5/2004 | Valembois et al. | |

(Continued)

FOREIGN PATENT DOCUMENTS

| | | |
|---|---|---|
| CN | 101875404 B | 10/2012 |
| EP | 2293007 A2 | 3/2011 |

(Continued)

*Primary Examiner* — Andrew Schechter
*Assistant Examiner* — Jeremy A Delozier
(74) *Attorney, Agent, or Firm* — Banner & Witcoff, Ltd.

(57) ABSTRACT

A coupling unit is disclosed for detachable coupling two pars of a spacecraft, the coupling unit connecting the two parts of the spacecraft in a connected condition and the coupling unit distancing the two parts of the spacecraft, when the coupling unit is in detached condition. The coupling unit comprises a first element and a second element engaged to each other in connected condition, with the second element comprising a gas generator for generating gas under pressure to detach the first and the second element to bring them in the detached position, thereby distancing the first element and the second element from each other, and thus also the first part and the second part connected to the respective elements.

17 Claims, 4 Drawing Sheets

(56) References Cited

U.S. PATENT DOCUMENTS

| | | | | |
|---|---|---|---|---|
| 2011/0048267 A1* | 3/2011 | Lee | ............... | F42B 15/36 |
| | | | | 102/378 |
| 2013/0101369 A1* | 4/2013 | Lenoir | ............... | F16B 31/00 |
| | | | | 411/2 |
| 2013/0327895 A1* | 12/2013 | Aston | ............... | B64G 1/645 |
| | | | | 244/173.3 |
| 2017/0305578 A1* | 10/2017 | Gibb | ............... | F03G 7/06 |

FOREIGN PATENT DOCUMENTS

| | | |
|---|---|---|
| JP | H101226499 A | 9/1989 |
| JP | 2004051042 A | 2/2004 |
| JP | 2019084932 A | 6/2019 |
| WO | 0173301 A1 | 10/2001 |

* cited by examiner

COUPLING UNIT FOR DETACHABLE COUPLING PARTS OF A SPACECRAFT

FIELD OF THE DISCLOSURE

The disclosure generally relates to a coupling unit for detachable coupling parts of a spacecraft.

DESCRIPTION OF RELATED ART

It is common practice in the space industry to use coupling units between parts of the spacecraft that are arranged to be destructively decoupled at some point after the launch of the spacecraft. A well-known situation is for example the staged separation of fuel tanks and boosters during the launch of a spacecraft. As another example, a lander commonly dispatches all unnecessary attachments to reduce weight before landing. Coupling units are for example also used to temporarily fix otherwise movable components, such as a solar panel or a robot arm, during the launch of the spacecraft to obviate damage to the otherwise movable component due to launch-related vibrations. The coupling units are destructively decoupled after completion of the launching sequence, allowing to movable components to move.

Pyrotechnic fasteners are commonly used as coupling units coupling parts of a spacecraft. A pyrotechnic fastener, such as an explosive bolt or an explosive nut, is a fastener comprising a pyrotechnic charge. Activation of the pyrotechnic charge, commonly by an electric current, causes the fastener to break, thus destructively decoupling the parts of the spacecraft previously coupled by the pyrotechnic fastener.

SUMMARY OF THE DISCLOSURE

With respect to pyrotechnic fasteners, the activation of the pyrotechnic charge can result in a shock with high loads which might harm sensitive structures of the spacecraft, such as electronics or measuring instruments. Also, some pyrotechnic fasteners only break the connection between two parts of the spacecraft, but do not provide for distance between the two parts of the spacecraft. Distancing the decoupled parts is often important for preventing collisions, for example between a lander and its previously dispatched rocket booster. A pyrotechnic fastener can therefore be combined with a separate thruster that is activated to thrust the decoupled parts away from each other. Such separate thruster can be mounted on the part with the lower weight requirement. Out of the two destructively decoupled parts one may have no further use for the spacecraft it was part of and in this case the separate thruster can be installed on the now useless part. In this case, after use, the thruster is then lost, together with the decoupled useless part. Another consequence of the separate thruster being mounted on the least important part and the function of the separate thruster providing thrust to spatially distance the two decoupled parts is that the often hot exhaust gases of the separate thruster are thrusted towards the more important part of the decoupled parts. In this case, the exhaust gases generated by a separate thruster often required to be used with the pyrotechnic fastener might damage the spacecraft. Also associated with this combination of a pyrotechnic fastener and a separate thruster is a requirement for two activations to carry out the decoupling of the parts, one for the pyrotechnic fastener and one for the separate thruster.

There is an ongoing need for improvements in coupling units for detachable coupling parts of a spacecraft, which can address one or more of the aforementioned drawbacks and/or provide for other advantages.

According to an aspect of the disclosure, there is provided for a coupling unit for detachable coupling of two parts of a spacecraft, wherein the coupling unit comprises a first element arranged for fixed connection to a first part of the spacecraft, and a second element arranged for fixed connection to a second part of the spacecraft wherein the first element and the second element are engageable to each other in a connected condition and wherein the first element, in the connected condition, is engaged inside of the second element and is fixedly connected to the second element via at least one breakable fixation element. The second element comprises a gas generator that is arranged to generate gas under pressure inside of the second element to break the at least one breakable fixation element and push the first element outside of the second element. The breakable fixation element can be a breakable pin and/or a breakable circlip and/or a breakable weld, or any other breakable connection.

By providing the first element and the second element that are engageable to each other in a connected condition, in which they are fixed to each other, the two parts of the spacecraft are fixedly connected to each other during flight, but can be disconnected from each other e.g. at a certain stage of the flight. The first element remains fixedly connected to the first part, and the second element remains fixedly connected to the second part of the spacecraft, so after disconnecting the first and the second element, the first part of the spacecraft and the second part of the spacecraft are disconnected from each other as well, and are detached from each other. By providing the gas generator in the second element, the gas generator can generate gas under pressure in the second element, such that the first element, due to the high gas pressure, is being pushed out of and away from the second element, thereby breaking the breakable fixation elements resulting in disconnection. During flight, and in connected condition, the first element and the second element are solely connected to each other via the breakable fixation elements. The breakable fixation elements thus are sufficiently strong dimensioned to take up and/or withstand the loads of launch and flight. The gas generator therefor is so powerful as to generate a sufficiently high pressure that can break the breakable fixation elements. Further, due to the high gas pressure the first element is being pushed out of the second element, such that the first element is entirely detached from the second element, and thus, also the first part of the spacecraft is being pushed at a distance from the second part of the spacecraft. So, by providing a first element engageable inside of the second element and a gas generator inside of the second element to generate gas under high pressure inside of the second element, a compact, reliable, safe and robust coupling unit is obtained that can connect two parts of a spacecraft safely during launch and flight phase, and can disconnect and set a distance between these same two parts when needed at a certain stage of flight. For example, the first element may extend inside of the second element, and the gas generated under pressure by the gas generator, may push against a bottom surface of the first element extending inside of the second element. Due to the large pressure, the first element is being pushed out of the second element and the first element and the second element are separated. In this example, the exhaust gases are outputted out of the second element.

It may also be appreciated that the coupling unit can be highly scalable. The gas generator can be easily adapted to the required pressure e.g. depending on the weight of the parts of the spacecraft and/or the distance to be reached between the two parts to be separated. Also, the first element and the second element can be easily adapted to withstand the pressure provided by the gas generator. The size of the coupling unit can be scaled quite easily and multiple coupling units can be arranged between the same two parts of a spacecraft. The inventors have found that by providing a first element engageable inside of the second element and a gas generator inside of the second element to generate gas under high pressure inside of the second element that can connect two parts of a spacecraft can disconnect and set a distance between these same two parts in around 10 to 20 ms, which is considerably faster than the combination of a pyrotechnic fastener and a separate thruster, which require up to 1s to disconnect and distance two parts. By providing a gas generated separation system, the actuation is much faster.

Optionally or additionally, the second element may further comprise a piston arranged to transfer the pressure inside of the second element to the first element. The gas under high pressure generated by the gas generator may push against the piston which piston may thus transfer the pressure towards the first element. The piston may be arranged movable inside the second element, but may be provided as abutting the first element to transfer the pressure. The pressure may be transferred in an efficient way, for example by providing a large piston surface exposed to the pressurized gas and a small piston surface arranged to engage the first element. The piston can provide a more efficient application of the pressure inside the second element onto the first element, which may result in a reliable breaking of the breakable fixation elements due to the pressure exerted onto the first element. In addition, by providing the gas generator inside of the second element to generate gas under pressure inside of the second element against the piston, the exhaust gases can remain inside of the second element. As such, exhaust gases may remain inside of the unit and are not outputted against any parts of the spacecraft, which may improve safe operation of the coupling unit. The piston may be embodied as a straight plate, movable in the second element, or the piston may be embodied as a hemispherical body or as a convex body. Many variants are possible. A much faster separation time can be obtained with the gas generator based coupling than with a conventional pyrotechnical bolt and thruster solution. Due to the short actuation time of the gas generator, within the limited piston stroke of the piston inside of the second element, a high difference in velocity between the first element, and the thereto connected first part, and the second element and the thereto connected second part, can be generated.

Optionally or additionally, the piston may be arranged to provide a gas-tight chamber in the second element. The piston can be further arranged to prevent the gas generated by the gas generator from exiting the second element and thus a gas-tight chamber is obtained. The space filled by the generated gas can be made gas-tight by the piston. In particular, the chamber can be made gas-tight by the piston as soon as the detached position is reached. The gas generated by the gas generator can thus remain inside of the gas-tight chamber thus preventing any harm to other parts of the spacecraft. The piston can be arranged movable inside of the second element, thus dividing the second element into two chambers, one gas chamber in which the gas generator is provided and another chamber. Due to the gas under pressure generated by the gas generator, the piston may then be pushed towards the first element, thus increasing the volume of the gas chamber and decreasing the volume of the other chamber. For example, the piston can be pushed away until the piston abuts the first element, and the other chamber is solved, the gas-tight chamber thereby filling the second element.

Optionally or additionally, the coupling unit further comprises a load absorbing element arranged to absorb loads of the piston abutting an end of the first element. By providing such a load absorbing element, any shock or impact loads caused by the explosion of the gas generator may be dampened, thus reducing the impact loads on the parts connected by the coupling unit. The load absorbing element can be a dampening element or a resilient element, or a combination thereof. For example, when the piston is arranged movable inside of the second element, the piston can move away from the gas generator and the second element and/or the first element can further comprise a dampening element to absorb loads when the piston abuts against the first element. The dampening element may be provided in the second element or may be provided in the first element. The dampening element may be a resilient element arranged to reduce the velocity of the piston when the piston approaches a side of the second element opposite to a side of the second element at which the gas generator is arranged. The piston can achieve a high velocity which might cause an impulse in the coupling unit when the piston collides with the second element. This impulse might propagate through parts of the spacecraft connected to the coupling unit. The resilient element may then absorb energy from the piston, thus decreasing a possible impulse caused by a collision between the piston and the second element. The resilient element can for example be a spring or a rubber buffer. The resilient element can be arranged between the piston and a side of the second element with which the piston may collide, in which case the resilient element can absorb energy from the piston by being compressed by the piston. The resilient element can also be arranged between the piston and a side opposite of the side of the second element with which the piston may collide, in which case the resilient element can be connected to the piston and the second element such that the resilient element absorbs energy from the piston by being tensioned by the piston. The resilient element can also be arranged at a side of the second element along which the piston passes, as to increase the friction between the second element and the piston. In this case the resilient element can absorb energy from the piston due to friction between the resilient element and the piston. It will be appreciated that the above mentioned examples of the resilient element are not exhaustive and that these mentioned examples can also be combined.

Optionally or additionally, the gas generator may further comprises a pressure regulating component arranged to regulate the flow of the gas generated by the gas generator towards the second element. The pressure regulating component may be provided as a pressure buffer that may be arranged to limit the flow of pressurized gas from the gas generator to the second element. The gas generator may have a fluctuating gas production rate. The pressure buffer may provide a more controlled increase of the pressure inside the second element in order to achieve a more controlled acceleration profile of the first element when moving from the connected condition to the detached condition.

Optionally or additionally, the first element may extend at least up to the piston in the connected condition. The first element may be engaged to the piston in the connected condition. As such the piston, in response to a pressure exerted onto the piston, transfers the pressure to the first element without moving until the at least one fixation element breaks. In fact, the piston then pushes against the first element under influence of the pressure exerted by the gas generator, until the breakable connections break and the first element can move. In comparison, when the first element does not extend up to the piston, the piston, in response to a pressure exerted on the piston, will accelerate until it abuts against the first element. The piston may then have a certain velocity when engaging the first element. The impact of the piston engaging the first element at a certain velocity may result in a less accurate and/or less precise distancing of the first element with respect to the second element.

Optionally or additionally, the piston may comprise a protrusion arranged to engage the first element. This may provide for accurate alignment and engagement of the first element with respect to the second element, and/or may provide for a reliable engagement between the first element and the second element. The protrusion can for example be a pin arranged to be received by a bore of the first element such that the end of the first element near the piston is relatively firmly engaged. It may also be appreciated that the first element may comprise a protrusion arranged to engage the piston.

Optionally or additionally, the first element may comprise a strut. The strut advantageously extends from an end of the first element facing the first part of the spacecraft towards the second element of the coupling unit. The strut may be arranged to engage with the piston of the second element, and to receive the pressure exerted by the piston onto the first element by the gas generator. Advantageously, the first element and the second element are connected to each other with breakable connection elements, which breakable connection elements can be provided through the strut of the first element and to the second element. Movement of the strut, under influence of the high pressure, may then break the breakable fixation elements. The strut may be arranged to transfer pressure to the at least one breakable fixation element. The strut may be connected to the second element by the at least on breakable fixation element at one end, and engage to the piston at an other end. A strut can carry high loads and has a low deformation under pressure. A strut is therefore well suited to transfer pressure, exerted onto the strut directly by the generated gas or by the piston, to the at least one breakable element without significant deformation.

The first element and/or the second element can both be cylindrically shaped, or can be e.g. spherical shaped. For example, the first element may comprise a base from which the strut protrudes, the base can be correspondingly shaped to the shape of the second element, such that, in connected condition, the first element and the second element may fit to each other. The first element may also be cylindrical and the second element may be spherical and vice versa.

Optionally or additionally, the strut can be arranged to be received in a bore or a recess of the second element. The strut may be received in the bore or in the recess of the second element, and may, at its end inside of the second element engage with a piston. The piston may receive the pressure exerted by the explosion gas to push the strut out of the second element. Optionally or additionally, the strut can be arranged to guide the first element after the at least one fixation element is broken. The strut can be a substantially straight strut. The shape of the strut defines the path along which the first element and the second element are distanced as long as at least a part of the strut extends with the second element. The length of the strut may thus provide for a guidance path, the longer the strut, the more the direction along which the first element and the second element are separated is defined. Therefore, a strut being received in a bore of the second element, may be guided by the bore when being pushed out of the bore. A relatively long strut may thus be advantageous for guidance of the first element with respect to the second element during separation.

Optionally or additionally, the second element may be arranged as a second element container and a second element lid. The second element container may be arranged to engage with the first element. The second element lid may be arranged to comprise the gas generator. The second element container lid may be arranged to be connected to the second element container and to form a closed second element. The second element container can for example be a cylindrical structure with one closed side, wherein the closed side may comprise the bore arranged to receive the first element. Alternatively, the second element container may be spherical shaped having an open side for receiving the second element lid. The side of the second element container opposite the closed side, may be open. The open side may be provided with external or internal threads to receive the second element lid. The second element lid can for example be a circular disk comprising the gas generator and a threaded outer rim, wherein the threaded outer rim may be arranged to engage the threaded open side of the second element container. The second element can be, at least partially, spherical shaped. The first element may then be cylindrically shaped, with the strut of the first element extending inside of the second element. Alternatively, the first element may be spherically shaped as well. In particular the base of the first element from which the strut is protruding can be correspondingly shaped with the shaped of the second element, such that in connected condition the base of the first element can engage with an outside of the second element.

Providing the second element as a composable element allows for an assembly method wherein parts of the coupling unit can be fixedly connected to the first part and/or the second part of the spacecraft before assembling the coupling unit. By providing the gas generator to the lid and closing the container with the lid, an efficient assembly of the second element, and of the coupling unit can be provided.

According to an aspect of the disclosure, there is provided a method for the assembly of a coupling unit for detachable coupling of two parts of a spacecraft comprising the steps of inserting a first element in a bore of a second element container, fixedly connecting the first element to the second element container via at least one breakable element, fixedly connecting the first element to a first part of the spacecraft, fixedly connecting the second element to a second part of the spacecraft, mounting a gas generator on a second element lid and fixedly connecting the second element lid to the second element container. It shall be appreciated that the order of the mentioned steps does not dictate the order in which the steps have to be executed.

Optionally or additionally, the method may further comprise the step of mounting a piston inside the second element container.

Optionally or additionally, the method may further comprise the step of mounting a dampening element inside the second element container wherein the dampening element may be arranged to absorb loads from the piston.

According to an aspect of the disclosure, there is provided a spacecraft comprising a first part and a second part coupled by a coupling unit as described hereinabove.

Optionally or additionally, the coupling unit may be assembled according one of the aforementioned methods.

A coupling unit is disclosed for detachable coupling two pars of a spacecraft, the coupling unit connecting the two parts of the spacecraft in a connected condition and the coupling unit distancing the two parts of the spacecraft, when the coupling unit is in detached condition. The coupling unit comprises a first element and a second element engaged to each other in connected condition, with the second element comprising a gas generator for generating gas under pressure to detach the first and the second element to bring them in the detached position, thereby distancing the first element and the second element from each other, and thus also the first part and the second part connected to the respective elements.

BRIEF DESCRIPTION OF THE DRAWINGS

The disclosure and various aspects of the disclosure are elucidated with reference to the drawing. In the drawing shows.

DETAILED DESCRIPTION

In the figures are like reference numerals used refer to identical or functionally similar elements throughout the separate views. The figures serve to further illustrate embodiments of aspects that include the claimed invention.

Figure 1:
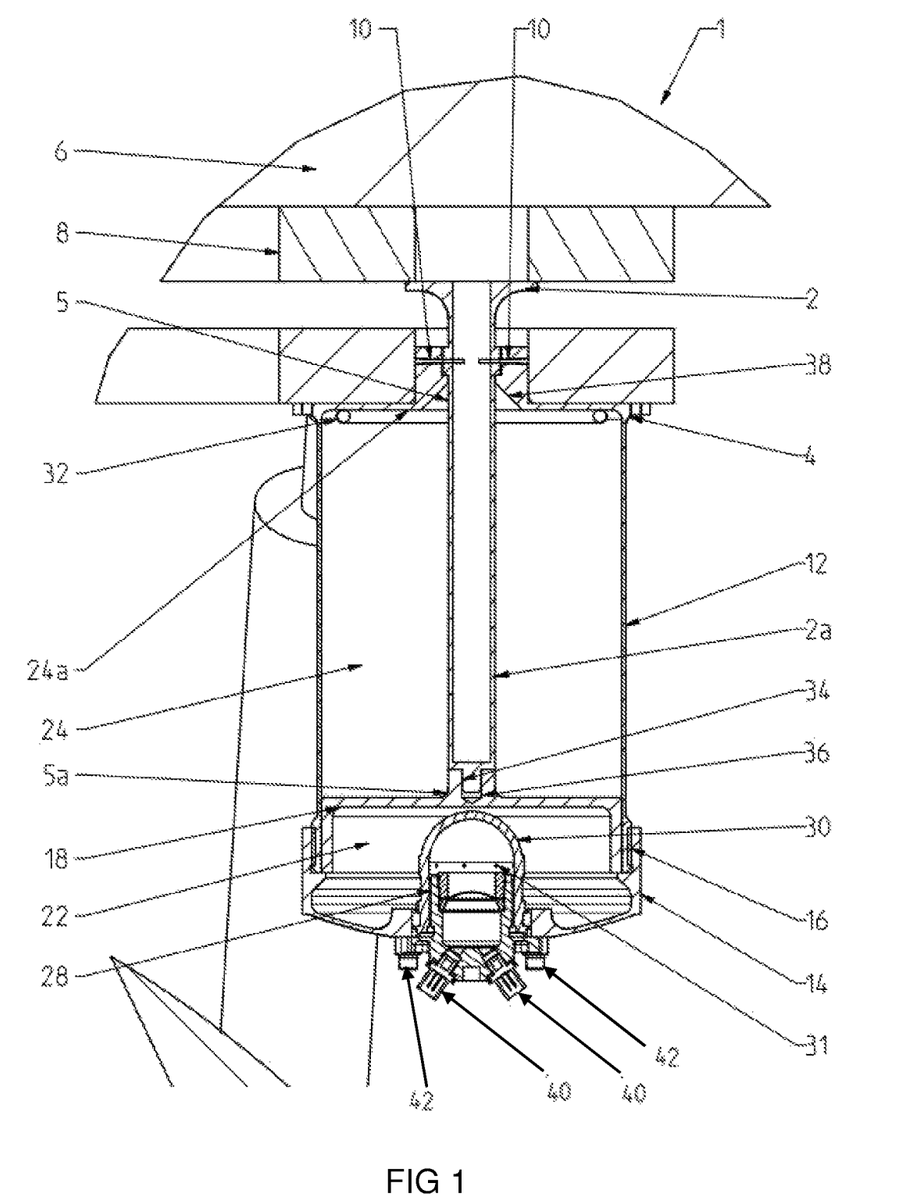
FIG. 1 a schematic cross section of a coupling unit according to an embodiment.

FIG. 1 shows a schematic cross section of a coupling unit 1 according to an embodiment. The coupling unit 1 comprises a first element 2 and a second element 4. The first element 2 is fixedly connected to a first part 6 of a spacecraft. The second element 4 is fixedly connected to a second part 8 of the spacecraft. The coupling unit 1 is here shown in connected condition in which the coupling unit 1 connects the first part 6 of the spacecraft and the second part 8 of the spacecraft.

The first element 2 is engageable to the second element 4, in particular the first element 2 engages an inside of the second element 4. The first element 2 can engage the second element 4 by extending inside of the second element 4, typically through an opening in a wall of the second element 4. Alternatively, the first element 2 can engage the second element 4 by at least partially extending in a bore 5 of the second element 4. The bore 5 is provided in a wall of the second element 4, and allows the first element 2 to at least partially be received in the bore 5, the bore 5 may thus be provided as a bore or opening in the second element 4 in which through which the strut 2a can be received. In the embodiment shown in FIG. 1, the second element 4 is provided with a bore 5. The second element 4 thus at least partially encloses a portion of the first element 2.

In FIG. 1, the first element 2 comprises a strut 2a. The strut 2a is fixedly connected to the first part 6 of the spacecraft by suitable connections. In connected condition, the first element 2 and the second element 4 are fixedly connected to each other via at least one breakable fixation element 10. In this embodiment, the breakable fixation elements 10 extend from the second element 4 into the strut 2a of the first element 2. In connected condition, the breakable fixation elements 10 are thus the only parts that hold the first element 2 and the second element 4 together during launch and flight of the spacecraft. The breakable fixation elements 10 are therefore dimensioned to withstand the high loads of launch, and possible of flight, of the spacecraft.

The first element 2 is connected to the second element 4 by the breakable fixation elements 10, here illustrated as at least two breaking pins 10. More breaking pins 10 can be provided, depending on the loads on the coupling unit 1.

The strut 2a of the first element 2 is here shown as a hollow cylinder extending up to a side 5a opposite the bore 5. By providing a hollow cylinder as the strut 2a, weight can be saved, while the strut can still be sufficiently stiff and strong.

The second element 4 is illustrated as a cylindrical shaped element comprising a second element container 12 and a second element lid 14. The second element container 12 is provided with the bore 5 extending towards an inner side of the container 12. The second element lid 14 is provided as a separate part that can be fixated to the second element container 12 to form a closed second element 4. By providing a container 12 and a lid 14, assembly of the second element 4 can be facilitated. The second element container 12 and the second element lid 14 are here connected by a threaded connection 16, but any other fixation can be used to firmly fixate the lid 14 to the container 12.

The second element 2 comprises a gas generator 28 that is arranged to generate gas under pressure inside of the second element to break the at least one breakable fixation element and to push the first element 2 outside of the second element 4. The gas generator 28 is a self-contained gas generator 28 comprising sufficient fuel, such that, upon ignition by an ignition system 40 an explosion is generated that produces gas under rather high pressure. The gas under pressure pushes against the first element 2, in particular against the strut 2a, and as such breaks the breakable fixation elements 10.

In an embodiment in which the strut 2a protrudes through an opening in the wall of the second element 4, an end of the strut 2a can be provided with a plate on which the gas under pressure can exert a high load to push the strut 2a outside of the second element, the plate may break loose of the strut 2a when the strut is leaving the second element 2. In this embodiment, a gas tight closure needs to be provided between the opening in the wall of the second element and the strut 2a. The plate can be considered as a piston 18 transferring the load from the gas under pressure onto the first element 2.

In another embodiment, the second element 4 may be provided with a piston 18 dividing the interior of the second element 4 in a gas chamber 22 and a compression chamber 24. The gas generator 28 is comprised in the gas chamber 22, the exhaust gases resulting from the explosion of the gas generator remain in the gas chamber 22 and push the piston 18 away from the gas generator 28 towards the first element 2. The piston 18 may abut against the strut 2a of the first element 2 to break the breakable fixation elements 10 and to push the first element 2 out of the second element 4. The strut 2a may extend inside of the second element 4, in particular into the compression chamber 24, through a hole in the wall of the second element, thereby a sufficient gas-tight closure of the piston 18 with respect to the wall of the second element 4 may be provided to prevent gas from leaking from the gas chamber 22 towards the compression chamber 24.

By providing the gas generator 28 in the second element, the explosion and exhaust gases resulting therefrom remain inside of the second element 4, in particular inside of the gas chamber 22. The strut 2a extends into the bore 5 of the second element 4 up to the piston 18. The gas chamber 22 comprises the gas generator 28 mounted onto the second element lid 14. Bolts 42 are used to mount the gas generator 28 onto the second element lid 14. Upon gas generation, the explosion gases remain in the gas chamber 22 exerting pressure onto the piston 18 and pushing the piston 18, and the strut 2a engaged with the piston 18, in a direction away from the gas generator 28. The volume of the compression chamber 24 becomes smaller until the piston 18 abuts against an opposite end of the container 12. By then, the load exerted onto the strut 2a by the gas under pressure is believed to be sufficiently large to provide an acceleration to the strut 2a and the first element 2 to separate the first element 2 from the second element 4 to a detached or separated condition. In detached position, the first element 2 with the strut 2a remains connected to the first part 6 of the spacecraft, and the second element 4 remains connected to the second part 8 of the spacecraft.

The coupling unit 1 is dimensioned to withstand accelerations and shocks during the launch of the spacecraft, thus maintaining the connection between the first and second part 6, 8 of the spacecraft. The gas generator 28 is activated in a controlled manner when a destructive decoupling of the first and second part 6, 8 is required. The pressure in the gas chamber 22 increases due to the gas generated by the gas generator 28. The piston 18 transfers the pressure inside the gas chamber 22 onto the strut 2a. The strut 2a, in turn, transfers the pressure onto the breaking pins 10. The breaking pins 10 break when a shear load induced by the pressure becomes equal or larger than a breaking load of the breaking pins 10. The coupling unit 1 is then no longer in the connected condition. The piston 18 and the strut 2a are now able to move with respect to the second element 4. The pressure exerted on the piston 18 and subsequently on the strut 2a may cause the piston 18, the strut 2a and the first part 6 of the spacecraft to accelerate with relation to the second element 4 and the second part 8 of the spacecraft. The direction in which the strut 2a and the first part 6 of the spacecraft distance themselves from the second element 4 and the second part 8 of the spacecraft may depends on the shape of the strut 2a. In the embodiment shown in FIG. 1, the strut 2a has a substantially straight linear shape, and as such the strut 2a and the first part 6 of the spacecraft move away from the second element 4 and the second part 8 of the spacecraft in a substantially linear direction. Alternatively, the strut 2a can have an arcuate shape forcing the first element 2 and the second element 4 to separate along an arcuate path. The guidance opening 5 through which the arcuate strut is being pushed, may have a corresponding arcuate shape to smoothly guide the strut. The piston can be hemispherical shaped or dome shaped, to move in the second element and to optimally push against the strut along its curved path. The opening 5 through which the strut 2a extends may correspond to the shape of the strut 2a to guide movement of the strut 2a along the path defined by the shape of the strut 2a.

In the embodiment shown in FIG. 1, the strut 2a is relatively long and extends approximately up to the piston 18, in connected condition, approximately at the other end of the coupling unit 1. Alternatively, the strut 2a may be much shorter and/or may be free of the piston in the connected condition, such that, when the explosion is generated, the piston first starts to move and then abuts the strut 2a to take the first element along in its movement. Alternatively, the piston may have various shapes and may e.g. be provided with a protrusion abutting against a relatively short strut 2a, thereby exerting pressure onto the strut 2a from the explosion onwards. Since the strut 2a is in this embodiment much shorter, and since the strut 2a remains connected to the first part 6 of the spacecraft, the struts 2a provided for much shorter extension from the first part 6, which may be beneficial e.g. for a landing vehicle.

The acceleration profile of the strut 2a may depend on the increase rate of the pressure in the gas chamber 22. The gas generator 28 may however have a fluctuating gas production due to the nature of a chosen gas generating substance. Therefore, the gas generator 28 further comprises a pressure regulating component 30 arranged to regulate the flow of the gas generated by the gas generator 28 towards the gas chamber 22. The pressure regulating component 30 is provided here as a pressure buffer 30 arranged to limit the flow of pressurized gas from the gas generator 28 towards the gas chamber 22. More specifically, the pressure regulating component 30 illustrated in FIG. 1 is arranged as a semi-dome mounted over the gas generator 28. Small holes 31 are provided in the semi-dome, allowing the pressurized gas to flow from the gas generator 28 towards the gas chamber 22 while limiting the maximum flow rate of the pressurized gas. The large amount of exhaust gases formed after the explosion are initially contained within the gas generator 28 by the pressure buffer 30, thus preventing a large pressure increase in the gas chamber 22 at the beginning of the explosion. The small holes 31 allow the large amount of exhaust gases to steadily flow from the gas generator 28 towards the gas chamber 22, resulting in a steadily increase of pressure inside the gas chamber 22. The pressure buffer 30 thus provides a more controlled increase of the pressure inside the gas chamber 22 in order to achieve a more controlled acceleration profile of the strut 2a when moving from the connected condition to the detached condition. The pressure buffer 30 is also arranged to contain the explosion caused by the ignition of the fuel of the gas generator, thus preventing, for example, damage to the piston 18 due to the explosion.

The piston 18 accelerates along with the strut 2a until the piston 18 reaches an upper side 24a of the compression chamber 24. There, the piston 18 abuts the other end of the container 12 and its movement is stopped. This usually gives rather high impact loads onto the container 12, and onto the second part 6 of the spacecraft connected to the second element 4. A load absorbing element 32 is arranged at the upper side 24a of the compression chamber 24 to absorb energy from the moving piston 18, thus at least lowering the impact of the piston 18 onto the second element 4. The load absorbing element 32 diminishes a shock caused by the piston 18 abutting the upper side of the compression chamber 24, preventing said shock to cause damage to other parts of the spacecraft. Here, the load absorbing element 32 is provided into the container 12, but, alternatively, the load absorbing material 32 can be provided at the side of the piston 18 abutting the upper side 24a of the second element 4. The load absorbing element 32 can be a load absorbing material, such as a resilient material like rubber. Alternatively, mechanical load absorbing elements can be provided such as spring and/or dampening elements.

The pressure exerted by the piston 18 onto the strut 2a might be sufficiently high to deform the strut 2a, e.g. the strut 2a may bend somewhat. Bending of the strut 2a can be dangerous, as the increased friction between the bended strut 2a and the second element container 12 can prevent the strut 2a from moving with relation to the second element container 12.

The strut 2a is provided with a pin 34 at the end of the strut 2a engaging a protrusion 36 arranged on the piston 18. The protrusion 36 prevents movement of the pin 34 in a direction substantially parallel to the surface of the piston 18. By preventing movement of the pin 34 in a direction substantially parallel to the surface of the piston 18, deformation of the strut 2a can be minimized. By engagement of the pin 34 to the protrusion 36 of the piston 18, the radial position of the strut 2a can remain stable, also during the pushing movement of the piston 18 against the strut 2a, thereby guiding the strut 2a outside of the second element 4 along a path defined by the shape of the strut 2a, here a straight path defined by the longitudinal shape of the strut 2a.

A receiver bore 38 is provided in the second element container 12, in particular in an upper side 24a thereof, to receive the protrusion 36 of the piston 18 when the piston 18 abuts against the upper side 24a, in the detached condition.

The gas chamber 22 and compression chamber 24 are filled with air at atmospheric pressure upon assembly on earth, before the launch of the spacecraft. The pressure in the compression chamber 24 will lower during launch, eventually approaching vacuum when in space. Vent holes (not shown) are arranged in the piston 18 to allow air present in the gas chamber 22 to flow to the compression chamber 24. The vent holes in the piston are provided for pressure equalization during transfer from atmospheric pressure on earth at launch to space vacuum. The vent holes prevent that a pressure difference occurs between the gas chamber 22 and the compression chamber 24 and thereby to avoid that such a pressure difference may reach the breaking pressure of the breaking pins 10. Otherwise the coupling unit 1 might destructively decouple too early. The vent holes are too small to allow a significant amount of pressurized gas from the gas generator 28 to flow towards the compression chamber 24 after the gas explosion. The vent holes are sealed off once the piston 18 is abutting the upper side 24a of the compression chamber 24. As such, the coupling unit 1 becomes gas-tight in the detached position. The vent holes can for example be sealed of by an O-ring (not shown) arranged between the piston 18 and the upper side of the compression chamber 24. The O-ring is compressed between the piston 18 and the upper side of the compression chamber 24 when the piston 18 abuts the upper side of the compression chamber 24, sealing of the vent holes. Alternatively, and/or additionally, the vent holes may be sealed off e.g. by the load absorbing material 32.

Figure 2A:
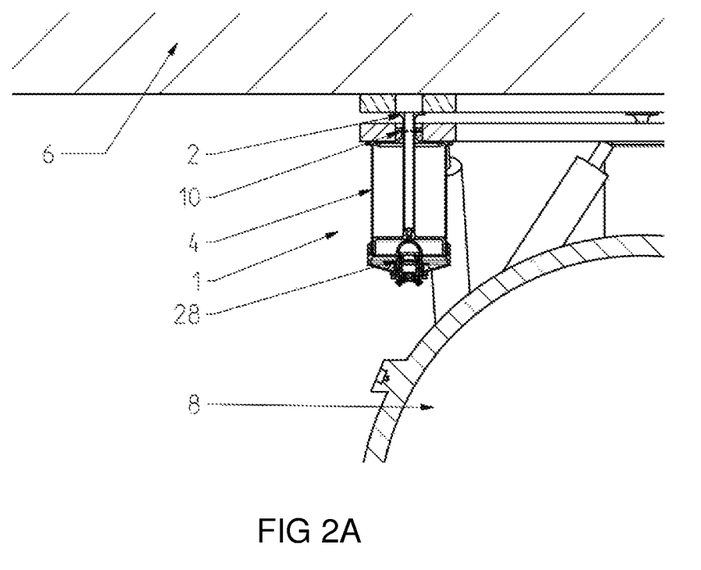
FIGS. 2a, 2b and 2c schematic cross sections of the coupling unit shown in FIG. 1 in respectively a connected condition, in an intermediate condition and in a detached condition.
Figure 2B:
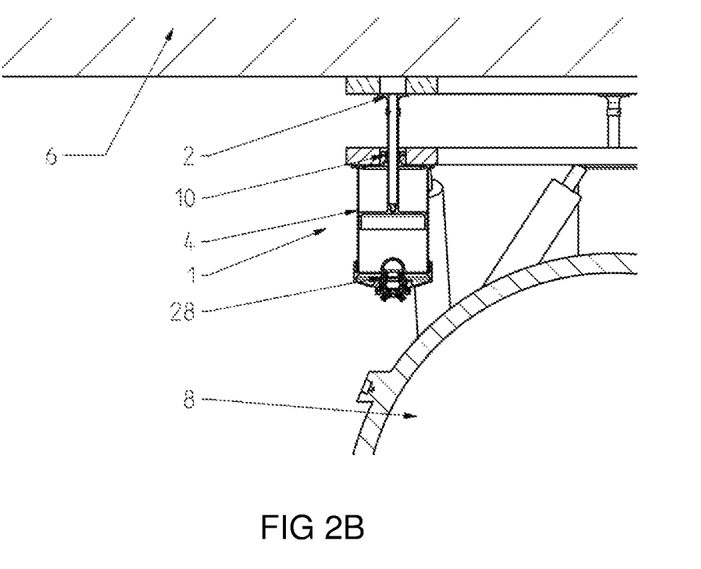
Figure 2C:
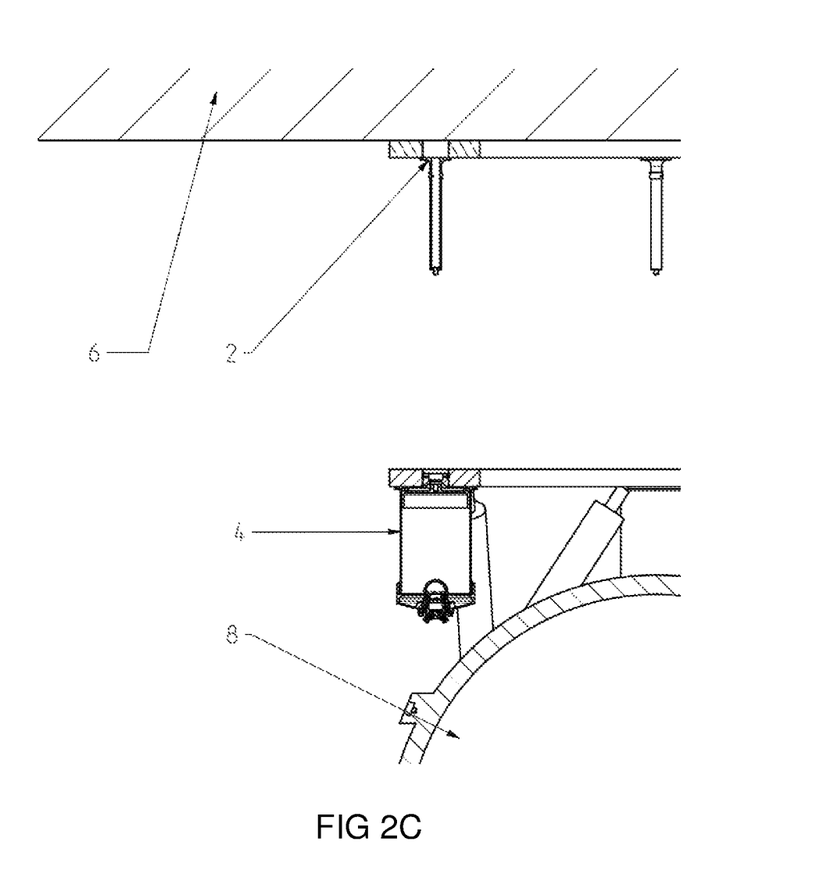

FIGS. 2a, 2b and 2c show schematic cross sections of the coupling unit 1 of FIG. 1 in respectively a connected condition, an intermediate condition in between the connected condition and the detached condition and in the detached condition.

FIG. 2a shows the coupling unit 1 in the connected condition. The coupling unit 1 comprises a first element 2 fixedly connected to a first part 6 of a spacecraft and a second element 4 fixedly connected to a second part 8 of the spacecraft. The first element 2 is fixedly connected to the second element 4 by at least one breakable fixation element 10. The coupling unit 1 is in the connected condition from assembly up to the moment destructive decoupling of the first and second part 6, 8 of the spacecraft is required. The gas generator 28 starts generating gas when destructive decoupling of the first and second part 6, 8 of the spacecraft is required. The pressure inside the gas chamber 22 of the second element 4 increases. The breakable fixation element 10 breaks once the pressure exerted on the breakable fixation element 10 is equal to or higher than the breaking pressure of the breakable fixation element 10. The first part 6 of the spacecraft is disconnected from the second part 8 of the spacecraft. The coupling unit 1 is not in the connected condition after the breaking fixation element 10 is broken and is now between the connected condition and the detached position.

FIG. 2b shows the coupling unit 1 between the connected condition and the detached position. The at least one breakable fixation element 10 connecting the first element 2 and the second element 4 has been broken. The pressure due the pressurized gas being generated by the gas generator 28 causes the first element 2 to accelerate. The first element 2 starts moving in the direction defined by the form of the first element 2, as described hereinabove. In the embodiment shown in FIG. 2b, the direction in which the first element 2 moves is substantially linear. The coupling unit 1 is in detached position when the first element 2 leaves the second element 4. The first part 6 of the spacecraft is now disconnected and distanced from the second part 8 of the spacecraft.

FIG. 2c show the coupling unit 1 in the detached position. The first element 2 is disconnected from the second element 4. In the embodiment illustrated in FIG. 2c, the first part 6 of the spacecraft is disconnected from the second part 8 of the spacecraft. In the vacuum of space, the relative velocity between first and second part 6, 8 of the spacecraft becomes constant and is equal to the relative velocity at the moment the contact between the first element 2 and the second element 4 ceases. In an other example of the embodiment, the first part 6 of the spacecraft may for example be a satellite and the second part 8 of the spacecraft may for example a solar panel. The solar panel may be connected to the satellite by a hinged connection at one point and by the coupling at an other point. The solar panel is allowed to hinge over the hinged connection after the coupling unit 1 has destructively decoupled.

Figure 3:
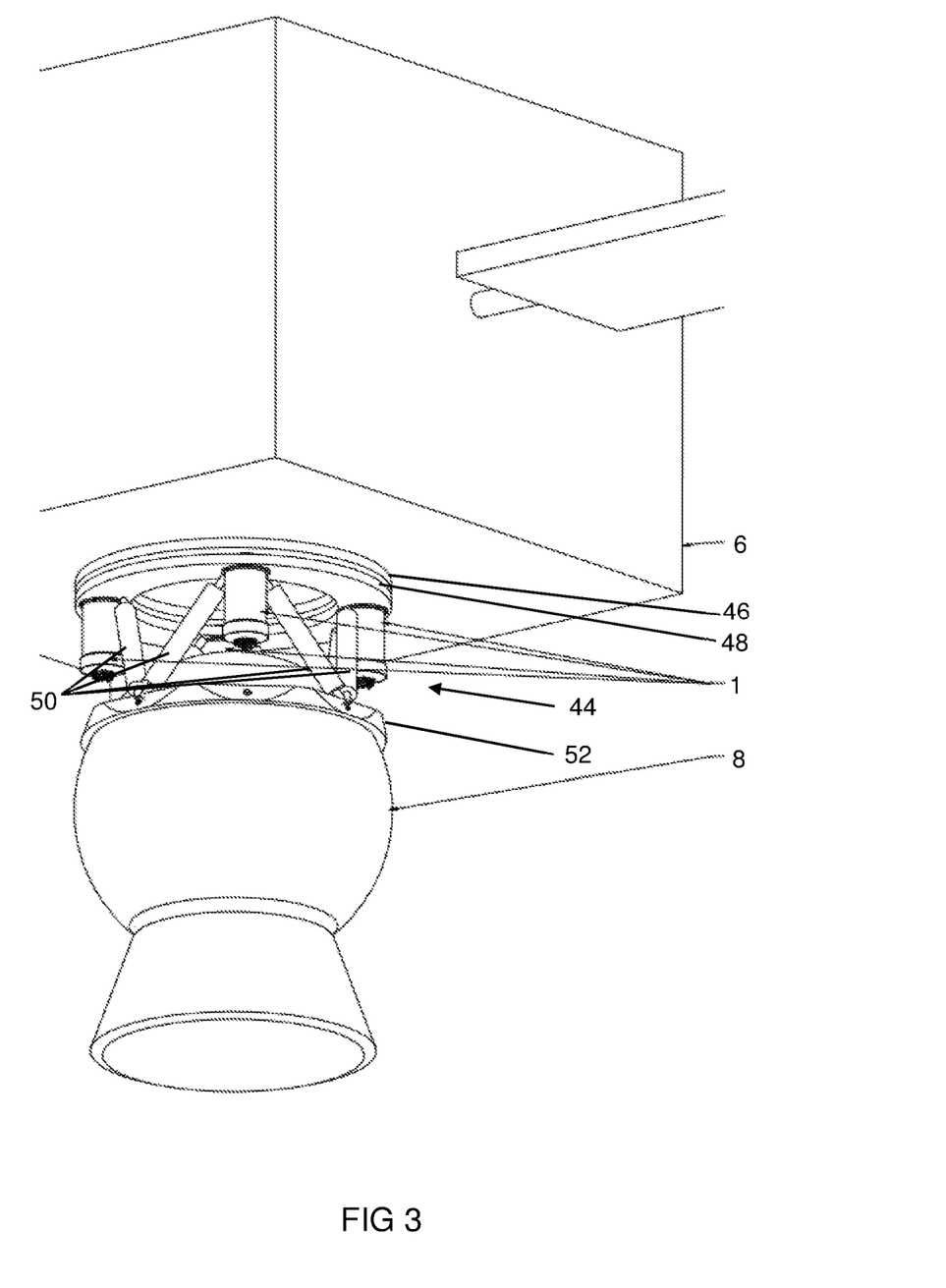
FIG. 3 a schematic arrangement of a number of coupling units between a first part of a spacecraft and a second part of a spacecraft.

FIG. 3 shows a schematic perspective view of a first part 6 and a second part 8 of a spacecraft coupled by a coupling assembly 44 comprising multiple coupling units 1. The first part 6 of the spacecraft is schematically drawn, and can for example be a lander. The second part 8 of the spacecraft is a schematically drawn rocket propulsion unit 8. The coupling assembly 44 comprises a first ring 46, fixedly mounted to the first part 6 of the spacecraft and to the first element 2 of each coupling unit 1. The coupling assembly 44 further comprises a second ring 48, fixedly mounted to the second part 8 of each coupling unit 1 and to a plurality of rods 50. The plurality of rods 50 connect the second ring 48 to a third ring 52, the third ring 52 being fixedly connected to the second part 8 of the spacecraft. The rods 50 can be static rods, or may comprise elastic or dampening components as these rods are subject also to the high loads during launch and flight. The propulsion unit 8 can be destructively decoupled from the lander 6 when the propulsion unit 8 is no longer required. The heavier of the first element 2 and of the second element 4 of the coupling unit 1 can be fixed to the propulsion unit 8 to minimize the weight added to the lander 6 by the other one of the first element 2 and of the second element 4 fixed to the lander 6. Driven by design limitations, the location of the coupling unit 1 could be alternated between the first and the second part of the spacecraft.

In the foregoing specification, specific embodiments have been described. It is noted that the coupling unit has been described as the first element being coupled to a first part of the spacecraft and the second element being coupled to a second part of the spacecraft, but it is apparent that the coupling unit can also be mounted vice versa. The first element and the second element can be any parts of the spacecraft that need to be distanced from each other at a certain stage of the flight. For example, it can be a lander to be separated from a main body of the spacecraft, or it can be a solar panel, or an arm, to be folded out when in space with respect to a stored, folded-in condition during launch. Many variants are possible.

However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued. For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

The following claims are hereby incorporated into the detailed description, with each claim standing on its own as a separately claimed subject matter. The mere fact that certain measures are recited in mutually different claims does not indicate that a combination of these measures cannot be used to an advantage. Many variants will be apparent to the person skilled in the art. All variants are understood to be comprised within the scope of the disclosure defined in the following claims.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. Further, many of the elements that are described may be functional entities that may be implemented as discrete or distributed components or in conjunction with other components, in any suitable combination and location. The invention is intended to embrace all alternatives, modifications and variations which fall within the scope of the appended claims.

The invention claimed is:

1. A coupling unit for detachable coupling of two parts of a spacecraft, wherein the coupling unit comprises:
   a first element configured for fixed connection to a first part of the spacecraft, wherein the first element comprises a strut;
   a second element configured for fixed connection to a second part of the spacecraft;
   wherein the first element and the second element are engageable to each other in a connected condition;
   wherein the strut of the first element, in the connected condition, is engaged inside of the second element by extending through a bore of the second element and is fixedly connected to the second element via at least one breakable fixation element;
   wherein the second element comprises a gas generator that is configured to generate gas under pressure inside of the second element to break the at least one breakable fixation element and push the first element, including the strut, outside of the second element, so as to distance the two parts of the spacecraft, by complete separation of the first element from the second element;
   wherein the strut is configured to guide the first element with respect to the second element after the at least one breakable fixation element is broken; and
   wherein the second element is further configured to contain all of said gas, generated by the gas generator, within the second element.

2. The coupling unit according to claim 1, wherein the second element comprises a piston configured to transfer pressure from the gas under pressure inside of the second element to the first element.

3. The coupling unit according to claim 2, wherein the piston divides the second element in a gas-tight chamber comprising the gas generator and a chamber at the other side of the piston.

4. The coupling unit according to claim 2, wherein the piston is movable in the second element.

5. The coupling unit according to claim 2, wherein the second element comprises a load absorbing element configured to absorb loads of the piston when abutting the first element.

6. The coupling unit according to claim 2, wherein the piston comprises vent holes for pressure equalization during transfer to space vacuum.

7. The coupling unit according to claim 1, wherein the gas generator comprises a pressure regulating component configured to regulate a flow of generated gas towards the second element.

8. The coupling unit according to claim 2, wherein the first element extends up to the piston in the connected condition.

9. The coupling unit according to claim 2, wherein the piston comprises a protrusion configured to engage the first element.

10. The coupling unit according to claim 1, wherein the second element comprises a second element container configured to receive the first element and a second element lid for closing the second element container to form the second element.

11. The coupling unit according to claim 10, wherein the second element lid comprises the gas generator.

12. A spacecraft comprising a first part and a second part coupled by one or more coupling units according to claim 1.

13. The coupling unit according to claim 1, wherein the at least one breakable fixation element comprises at least two breakable fixation elements extending from the second element into the strut of the first element.

14. The coupling unit according to claim 13, wherein the breakable fixation elements are breaking pins.

15. A method for the assembly of a coupling unit for detachable coupling of two parts of a spacecraft comprising the steps of:
- inserting a strut of a first element in a bore of a second element container;
- fixedly connecting the strut of the first element to the second element container via at least one breakable element;
- fixedly connecting the first element to a first part of the spacecraft;
- fixedly connecting the second element to a second part of the spacecraft;
- mounting a gas generator on a second element lid; and
- fixedly connecting the second element lid to the second element container,
- wherein the gas generator is configured to generate gas under pressure inside of the second element to break the breakable element and push the first element, including the strut, outside of the second element, so as to distance the two parts of the spacecraft, by complete separation of the first element from the second element;
- wherein the strut is configured to guide the first element with respect to the second element after the at least one breakable fixation element is broken; and
- wherein the second element is further configured to contain all of said gas, generated by the gas generator, within the second element.

16. The method according to claim 15, further comprising mounting a piston inside the second element container.

17. The method according to claim 16, further comprising mounting a dampening element inside the second element container wherein the dampening element is configured to absorb loads from the piston.

* * * * *